US012635007B2

(12) United States Patent     (10) Patent No.:   US 12,635,007 B2
Ma               (45) Date of Patent:     May 19, 2026

(54) CALL ESTABLISHMENT METHOD AND APPARATUS, ELECTRONIC DEVICE, AND READABLE STORAGE MEDIUM

(71) Applicant: VIVO MOBILE COMMUNICATION CO., LTD., Dongguan (CN)

(72) Inventor: Wenfei Ma, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 317 days.

(21) Appl. No.: 18/241,360

(22) Filed: Sep. 1, 2023

(65) Prior Publication Data

US 2023/0413349 A1     Dec. 21, 2023

Related U.S. Application Data

(63) Continuation of application No. PCT/CN2022/077934, filed on Feb. 25, 2022.

(30) Foreign Application Priority Data

Mar. 3, 2021    (CN)  ......................... 202110236780.X

(51) Int. Cl.
    H04L 29/06       (2006.01)
    H04L 5/00        (2006.01)
            (Continued)

(52) U.S. Cl.
    CPC ........... H04W 76/10 (2018.02); H04L 5/0055 (2013.01); H04W 4/16 (2013.01)

(58) Field of Classification Search
    CPC ............. H04L 65/1104; H04L 65/1006; H04L 65/1016; H04L 5/0055; H04L 65/1069;
             (Continued)

(56) References Cited

U.S. PATENT DOCUMENTS 9,871,713 B2 *   1/2018   Forsberg ............. H04L 65/1016
10,039,019 B2 *   7/2018   Mufti .................... H04W 76/19
              (Continued)

FOREIGN PATENT DOCUMENTS

CN     105099645 A    11/2015
CN     106717106 A     5/2017
            (Continued)

OTHER PUBLICATIONS

Extended European Search Report regarding European Patent Application No. 22762447.5, dated Jun. 24, 2024.
(Continued)

*Primary Examiner* — Sithu Ko
*Assistant Examiner* — Vanneilian Lalchinthang
(74) *Attorney, Agent, or Firm* — Harness, Dickey & Pierce, P.L.C.

(57)          ABSTRACT

A call establishment method includes: in a case that a first INVITE request sent by a second electronic device is received and that an INVITE ACK message sent by the second electronic device is not received, receiving a second INVITE request; and in a case that it is determined that both the second INVITE request and the first INVITE request are sent by the second electronic device, sending a target message to the second electronic device, and establishing a communication connection based on the second INVITE request. The target message is used for interrupting a communication connection established on the basis of the first INVITE request.

12 Claims, 3 Drawing Sheets

(51) Int. Cl.

| | |
|---|---|
| *H04W 4/16* | (2009.01) |
| *H04W 28/02* | (2009.01) |
| *H04W 76/10* | (2018.01) |
| *H04W 76/15* | (2018.01) |

(58) Field of Classification Search

CPC ....... H04L 69/40; H04W 76/10; H04W 76/11; H04W 76/15; H04W 28/0252; H04W 4/16; H04W 28/0263; H04W 28/0236; H04W 24/04

USPC ........................................................ 370/329

See application file for complete search history.

(56) References Cited

U.S. PATENT DOCUMENTS

| | | | | |
|---|---|---|---|---|
| 10,117,211 | B2 * | 10/2018 | Piscopo, Jr. .......... | H04W 60/00 |
| 10,149,346 | B2 * | 12/2018 | He ........................ | H04W 76/38 |
| 10,231,275 | B2 | 3/2019 | Chiang et al. | |
| 10,681,762 | B2 * | 6/2020 | Chiang ............... | H04L 65/1016 |
| 2004/0081159 | A1 * | 4/2004 | Pan ..................... | H04L 65/1069 |
| | | | | 370/395.2 |
| 2017/0353503 | A1 * | 12/2017 | Trabelsi .............. | H04L 65/1104 |
| 2019/0081991 | A1 * | 3/2019 | Murugesh ........... | H04L 65/1069 |
| 2019/0200409 | A1 * | 6/2019 | Chiang ................. | H04W 76/11 |
| 2019/0253551 | A1 * | 8/2019 | Pasumarthi ......... | H04W 68/025 |
| 2019/0313229 | A1 | 10/2019 | Chiang et al. | |
| 2020/0252440 | A1 * | 8/2020 | El-Gawady ......... | H04L 65/1059 |

FOREIGN PATENT DOCUMENTS

| | | |
|---|---|---|
| CN | 109804609 A | 5/2019 |
| CN | 109981527 A | 7/2019 |
| CN | 110602331 A | 12/2019 |
| CN | 111294327 A | 6/2020 |
| CN | 113163509 A | 7/2021 |
| WO | WO-2013170889 A1 | 11/2013 |
| WO | WO-2016065601 A1 | 5/2016 |
| WO | WO-2017160682 A1 | 9/2017 |

OTHER PUBLICATIONS

First Office Action regarding Chinese Patent Application No. 202110236780.X, dated Mar. 17, 2022. Translation provided by Bohui Intellectual Property.

International Search Report and Written Opinion of the International Searching Authority regarding International Patent Application No. PCT/CN2022/077934, dated Mar. 30, 2022. Translation provided by Bohui Intellectual Property.

\* cited by examiner

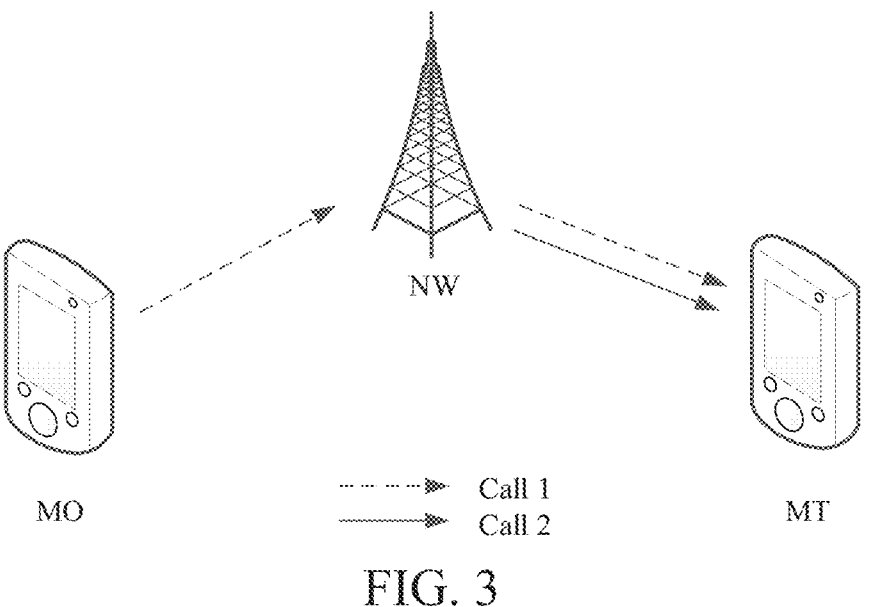

MO                                           NW                                           MT

- - - - ▶ Call 1
──────▶ Call 2

FIG. 3

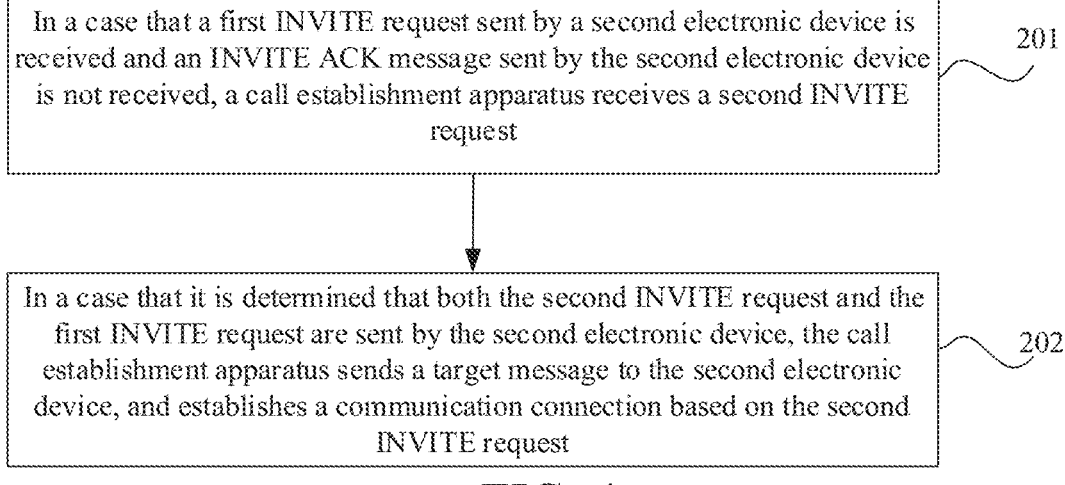

In a case that a first INVITE request sent by a second electronic device is received and an INVITE ACK message sent by the second electronic device is not received, a call establishment apparatus receives a second INVITE request          201

In a case that it is determined that both the second INVITE request and the first INVITE request are sent by the second electronic device, the call establishment apparatus sends a target message to the second electronic device, and establishes a communication connection based on the second INVITE request          202

FIG. 4

CALL ESTABLISHMENT METHOD AND APPARATUS, ELECTRONIC DEVICE, AND READABLE STORAGE MEDIUM

CROSS-REFERENCE TO RELATED APPLICATIONS

This application is a Bypass Continuation Application of PCT/CN2022/077934 filed on Feb. 25, 2022, which claims the priority of Chinese Patent Application No. 202110236780.X filed on Mar. 3, 2021, their entire content of which is incorporated herein by reference.

TECHNICAL FIELD

Embodiments of this application relate to the field of communication technology, and in particular, to a call establishment method and apparatus, an electronic device, and a readable storage medium.

BACKGROUND

With the development of electronic device technology, users use electronic devices for voice over long-term evolution (VoLTE) video or voice calls based on session initiation protocol (SIP) more and more frequently.

In related technology, during establishment of a VoLTE call between two electronic devices, a mobile terminated (MT) device will not respond to a new VoLTE call. Furthermore, for a received request for establishing a new VoLTE call, the MT device will send a 486 (user busy) error code.

However, when the MT device receives two different INVITE requests from the same mobile original (MO) device, due to asynchronous communication between a network and the terminal, both the INVITE requests fail, making it impossible to establish a video or voice call, reducing a success rate of establishing a VoLTE call, and the like.

SUMMARY

Embodiments of this application provide a call establishment method and apparatus, an electronic device, and a readable storage medium.

According to a first aspect, the embodiments of this application provide a call establishment method. The method includes: in a case that a first INVITE request sent by a second electronic device is received and that an INVITE ACK message sent by the second electronic device is not received, receiving a second INVITE request; and in a case that it is determined that both the second INVITE request and the first INVITE request are sent by the second electronic device, sending a target message to the second electronic device, and establishing a communication connection based on the second INVITE request, where the target message is used for interrupting a communication connection established on the basis of the first INVITE request.

According to a second aspect, the embodiments of this application further provide a call establishment apparatus. The apparatus includes: a receiving module and an execution module; the receiving module being configured to: in a case that a first INVITE request sent by a second electronic device is received and that an INVITE ACK message sent by the second electronic device is not received, receive a second INVITE request; and the execution module being configured to: in a case that it is determined that both the second INVITE request and the first INVITE request received by the receiving module are sent by the second electronic device, send a target message to the second electronic device, and establish a communication connection based on the second INVITE request, where the target message is used for interrupting a communication connection established on the basis of the first INVITE request.

According to a third aspect, the embodiments of this application provide an electronic device, including a processor, a memory, and a program or an instruction stored in the memory and executable on the processor, where the program or instruction, when executed by the processor, implements the steps of the call establishment method according to the first aspect.

According to a fourth aspect, the embodiments of this application provide a non-transitory readable storage medium, where the non-transitory readable storage medium stores a program or an instruction, and the program or instruction, when executed by a processor, implements the steps of the call establishment method according to the first aspect.

According to a fifth aspect, the embodiments of this application provide a chip, where the chip includes a processor and a communication interface; the communication interface is coupled to the processor; and the processor is configured to run a program or an instruction to implement the call establishment method according to the first aspect.

According to a sixth aspect, the embodiments of this application provide a computer program product, where the program product is executed by at least one processor to implement the method according to the first aspect.

BRIEF DESCRIPTION OF THE DRAWINGS

FIG. 3 is a third schematic flowchart of a SIP call establishment method according to an embodiment of this application;

FIG. 4 is a schematic flowchart of a call establishment method according to an embodiment of this application;

DETAILED DESCRIPTION

The technical solutions in embodiments of this application are clearly described below with reference to the accompanying drawings in the embodiments of this application. Apparently, the described embodiments are merely some rather than all of the embodiments of this application. All other embodiments obtained by a person of ordinary skill in the art based on the embodiments of this application shall fall within the protection scope of this application.

Terms "first", "second" and the like in this specification and claims of this application are used for distinguishing similar objects, but are unnecessarily used for describing a specific sequence or order. It should be understood that data used like this is interchangeable where appropriate, so that the embodiments of this application can be implemented in an order other than those illustrated or described here. Furthermore, objects distinguished by "first", "second", and the like are usually of the same class and do not limit the number of objects. For example, the first object can be one or more. In addition, "and/or" used in this specification and the claims represents at least one of the connected objects. Symbol "/" usually represents an "or" relationship between front and back associated objects.

A call establishment method provided by the embodiments of this application can be applied to a scenario for establishing a SIP-based call.

Figures 1, 2:
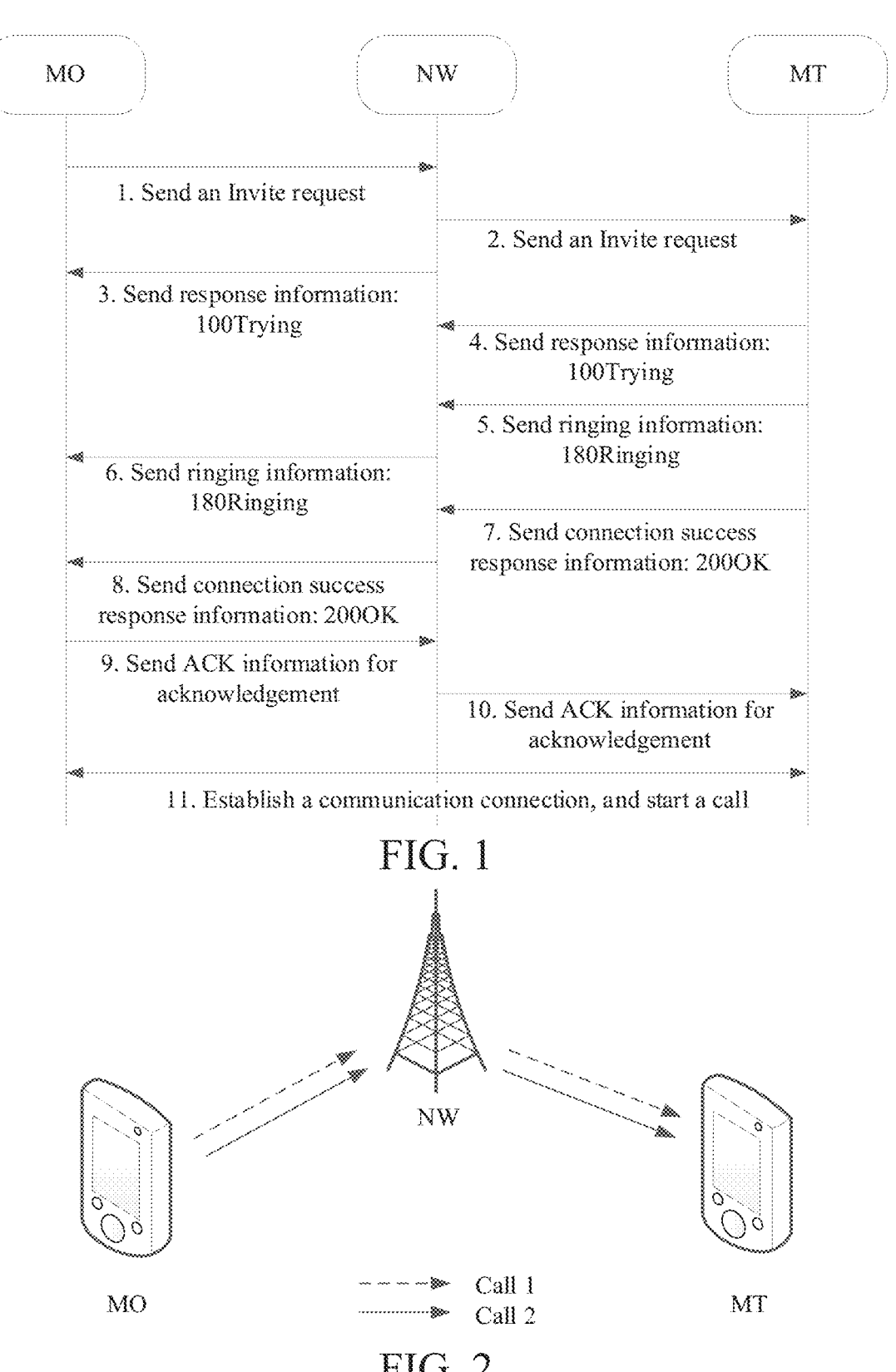
FIG. 1 is a first schematic flowchart of a SIP call establishment method according to an embodiment of this application.
FIG. 2 is a second schematic flowchart of a SIP call establishment method according to an embodiment of this application.

FIG. 1 shows a schematic flowchart of establishing a SIP-based call connection between two electronic devices (an MO device and an MT device). As shown in FIG. 1, in a case that a call connection is established between the MO device and the MT device on the basis of a SIP, the method may include the following steps:

Step 1: The MO device initiates a call request, and sends an INVITE request to a network (NW) device. The above INVITE request includes a session type and call parameters (for example, a network address of the MT device) of a session established by the MO device and the MT device. Exemplarily, the above session type can be a voice session, or can be a multimedia video used in a net meeting, or can be a game session.

Step 2: After receiving the INVITE request sent by the MO device, the NW device interpolates a network address of the NW device into the INVITE request, and sends the INVITE request to the MT device indicated by the INVITE request. After receiving the INVITE request sent by the NW device, the MT device sends response information to the NW device: 100Trying. At this time, the MT device rings to prompt a user that there is an incoming call, and then sends ringing information to the NW device: 180Ringing. After receiving the ringing information sent by the MT device, the NW device sends the ringing information to the MO device: 180Ringing.

In addition, after receiving the INVITE request sent by the MO device, the NW device may send the response information to the MO device while sending the INVITE request to the MT device: 100Trying.

Step 3: After the user of the MT device picks up the phone, the MT device sends connection success response information to the NW device: 200OK. After receiving the connection success response information sent by the MT device, the NW device sends the connection success response information to the MO device: 200OK.

Step 4: After receiving the connection success response information sent by the NW device, the MO device sends acknowledge character (ACK) information to the NW device for acknowledgment. After receiving the ACK information sent by the MO device, the NW device sends the ACK information to the MT device for acknowledgment. After the acknowledgment, the MO device and the MT device establish a communication connection and start a call.

For the above scenario of establishing the SIP-based call, there are some special scenarios in the related technology. In these scenarios, it is possible that establishment of SIP calls between electronic devices fails. Exemplarily, in scenario 1 as shown in FIG. 2, after the MO device fails in origination of a VoLTE call 1, the MO device falls back to a CS field and initiates a VoLTE call 2 again. In scenario 2 as shown in FIG. 3, the MO device initiates a VoLTE call 1, but due to some reasons, the NW device considers that an INVITE request of the call 1 is abnormal, so that the NW device may send a new INVITE request again after sending the INVITE request to the MT device.

In the above two scenarios, the MT device may receive two different INVITE requests, that is, the two INVITE requests have the same number of From header fields, the same number of To header fields, and different Call-id values. The MT device may reply a 486 (user busy) error code for the INVITE request of the call 2 according to an RFC3261 protocol, and the NW device may clear away INVITE affairs of the call 1, so that the INVITE requests of the two calls fail, and the MO device and the MT device cannot be connected via a voice or video call.

For the above problems, the embodiments of this application provide a call establishment method to solve the above problems. The call establishment method provided by the embodiments of this application is described in detail below through some embodiments and application scenarios thereof in combination with the accompanying drawings.

FIG. 4 shows the call establishment method provided by the embodiments of this application. The method may include the following step 201 and step 202:

Step 201: In a case that a call establishment apparatus receives a first INVITE request sent by a second electronic device and does not receive an INVITE ACK message sent by the second electronic device, the call establishment apparatus receives a second INVITE request.

Exemplarily, in the above scenarios as shown in FIG. 2 and FIG. 3, the MO device initiates the INVITE request for establishing a SIP call, and the SIP call is not established successfully, that is, the MT device does not receive an INVITE ACK message sent by the MO device. In a case that the SIP call is not established successfully, the MT device receives another INVITE request for establishing a SIP call.

Usually, the MT device may reply a 486 error code, and reject the second INVITE request for establishing a SIP call. However, in the scenarios as shown in FIG. 2 and FIG. 3, since the MT device rejects the second INVITE request, and the NW device clears away affairs of the first INVITE request, the establishments of the two SIP calls fail.

Step 202: In a case that it is determined that both the second INVITE request and the first INVITE request are sent by the second electronic device, the call establishment apparatus sends a target message to the second electronic device, and establishes a communication connection based on the second INVITE request, where the above target message is used for interrupting a communication connection established on the basis of the first INVITE request.

Exemplarily, in the scenarios as shown in FIG. 2 and FIG. 3, the above second INVITE request can be sent by the MO device or the NW device, so that the above second electronic device can be an MO device or an NW device. Correspondingly, the above first electronic device can be an NW device or an MT device.

Exemplarily, after receiving the above second INVITE request, the first electronic device sends, to the second electronic device, the target message used for interrupting the communication connection established on the basis of the first INVITE request, and establishes the communication connection based on the second INVITE request. The first electronic device and the second electronic device can be devices of different combinations in different scenarios, so that the above target message is also different in different scenarios.

It can be understood that according to the call establishment method provided by the embodiments of this application, after receiving two different INVITE requests sent by the same electronic device, the first electronic device interrupts, in the manner of sending the target message to the electronic device, the communication connection established on the basis of the first INVITE request, and establishes the communication connection based on the second INVITE request.

It should be noted that in a case that the above second INVITE request and the above first INVITE request are sent by different electronic devices, the first electronic device can directly reject the second INVITE request without affecting the establishment of the SIP call based on the first INVITE request with the second electronic device.

In this way, in a case that the first INVITE request sent by the second electronic device is received and that the INVITE ACK message sent by the second electronic device is not received, and in a case that the second INVITE request sent by the second electronic device is received, the communication connection established on the basis of the first INVITE request is interrupted in a manner of sending the target message to the second electronic device, and the communication connection based on the second INVITE request is established, which increases the success rate of establishing a SIP-based call by the electronic devices in the above scenarios.

Optionally, in the embodiments of this application, different scenarios correspond to different first electronic devices and different second electronic devices.

In the scenario as shown in FIG. 2:

Exemplarily, the device that sends the second INVITE request is an MO device, so that the first electronic device is a network NW device in a case that the second electronic device is the MO device.

In the scenario as shown in FIG. 3:

Exemplarily, the device that sends the second INVITE request is an NW device, so that the first electronic device is an MT device in a case that the second electronic device is the NW device.

Optionally, in the embodiments of this application, for the scenario as shown in FIG. 2, in a case that the second electronic device is the MO device and the first electronic device is the NW device, the above target message can be a CANCEL message.

Exemplarily, in a case that the second electronic device is the MO device, the above step 202 can include the following step 202*a:*

Step 202*a*: The call establishment apparatus sends a CANCEL message to the second electronic device, and sends the second INVITE request to the MT device.

Exemplarily, in a case that the first electronic device is the NW device and the second electronic device is the MO device, after receiving the second INVITE request sent by the second electronic device, the first electronic device can send the CANCEL message to the second electronic device to interrupt the communication connection established on the basis of the first INVITE request. At this time, the MT device can also interrupt the communication connection, established on the basis of the first INVITE request, with the MO device.

Exemplarily, after the communication connection established on the basis of the first INVITE request is interrupted, the first electronic device further needs to send the second INVITE request to the MT device to enable the MO device and the MT device to establish the communication connection based on the second INVITE request.

In this way, in a case that the second electronic device is the MO device and the first electronic device is the NW device, the first electronic device can send the CANCEL message to the second electronic device, and send the second INVITE request to the MT device, to ensure that the MO device and the MT device can successfully establish the SIP call.

Optionally, in the embodiments of this application, for the scenario as shown in FIG. 3, in a case that the second electronic device is the NW device and the first electronic device is the MT device, the above target message can be a BYE message.

Exemplarily, in a case that the second electronic device is the NW device, the above step 202 can include the following step 202*b:*

Step 202*b*: The call establishment apparatus sends a BYE message to the second electronic device, and establishes a target communication connection with the second electronic device, where the above target communication connection is established on the basis of the second INVITE request.

Exemplarily, in a case that the above first electronic device is the MT device and the second electronic device is the NW device, after receiving the second INVITE request sent by the second electronic device, the first electronic device can send the BYE message to the second electronic device to interrupt the communication connection established on the basis of the first INVITE request. The BYE message is forwarded by the second electronic device to the MO device. At this time, the first electronic device can interrupt the communication connection, established on the basis of the first INVITE request, with the MO device.

Exemplarily, after sending the BYE message to the MO device, the first electronic device can send, to the MO device, a connection success response information, namely a 200OK message, shown in step 3 in FIG. 1. The 200OK message is sent in response to the second INVITE request, and is used for establishing the communication connection based on the second INVITE request with the MO device.

It should be noted that in the scenario as shown in FIG. 2, in a case that the NW device does not send the CANCEL message to the MO device after receiving the second INVITE request sent by the MO device, and sends the second INVITE request to the MT device, the MT device can process the first INVITE request and the second INVITE request according to the processing method of the first electronic device in the scenario as shown in FIG. 3.

In this way, in a case that the second electronic device is the NW device and the first electronic device is the MT device, the first electronic device can send the BYE message to the second electronic device, and send the 200OK message to the MO device, to ensure that the MO device and the MT device can successfully establish the SIP call.

Optionally, in the embodiments of this application, the first electronic device can determine, according to information carried in the INVITE request, whether the first INVITE request and the second INVITE request are sent by the same electronic device.

Exemplarily, the above step 202 may include the following step 202*c:*

Step 202*c*: in a case that the call establishment apparatus determines, according to target information, that both the second INVITE request and the first INVITE request are sent by the second electronic device, the call establishment apparatus sends the target message to the second electronic device, where the above target information includes at least one of the following items: a From header field, a To header field, or a Call-id value.

Exemplarily, different first electronic devices can determine, according to different information, whether the received first INVITE request and the received second INVITE request are sent by the same electronic device.

For example, when the first electronic device is the MT device, since the To header field of the INVITE request points to the first electronic device, the first electronic device can receive the INVITE request. Therefore, the first electronic device can determine, only according to the From header field of the INVITE request, whether the first INVITE request and the second INVITE request are sent by the same electronic device.

In this way, for different scenarios, the first electronic device can determine, according to different information, whether the first INVITE request and the second INVITE request are sent by the same electronic device.

According to the call establishment method provided by the embodiments of this application, in a case that a first INVITE request sent by the second electronic device is received and that the INVITE ACK message sent by the second electronic device is not received, and in a case that the second INVITE request sent by the second electronic device is received, for different application scenarios, the communication connection established on the basis of the first INVITE request can be interrupted by sending different target messages to the second electronic device, and the communication connection based on the second INVITE request is established, which increases the success rate of establishing a SIP-based call by the electronic devices in the above scenarios.

It should be noted that an executive body of the call establishment method provided by the embodiments of this application can be the call establishment apparatus, or a control module configured to implement the call establishment method in the call establishment apparatus. In the embodiments of this application, by way of example, the call establishment apparatus implements the call establishment method to describe the call establishment apparatus provided by the embodiments of this application.

It should be noted that in the embodiments of this application, all the call establishment methods shown in all the method drawings are exemplarily described in combination with one drawing in the embodiments of this application. During implementation, the call establishment methods shown in the above method drawings may be further implemented with reference to any other combinable accompanying drawings schematically described in the above embodiments, details of which are omitted here.

Figure 5:
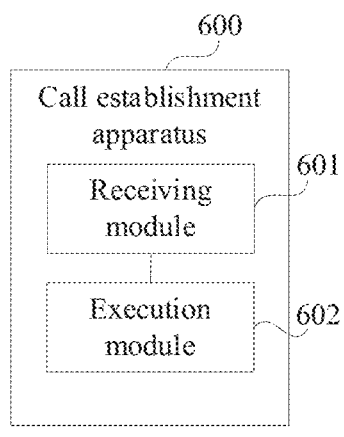
FIG. 5 is a schematic structural diagram of a call establishment apparatus according to an embodiment of this application.

FIG. 5 is a possible schematic structural diagram of a call establishment apparatus according to an embodiment of this application. As shown in FIG. 5, the call establishment apparatus 600 includes: a receiving module 601 and an execution module 602. The receiving module 601 is configured to: in a case that a first INVITE request sent by a second electronic device is received and that an INVITE ACK message sent by the second electronic device is not received, receive a second INVITE request; and the execution module 602 is configured to: in a case that both the second INVITE request and the first INVITE request received by the receiving module 601 are sent by the second electronic device, send a target message to the second electronic device, and establish a communication connection based on the second INVITE request, where the target message is used for interrupting a communication connection established on the basis of the first INVITE request.

Optionally, in a case that the second electronic device is an MO device, the first electronic device is a network NW device; and in a case that the second electronic device is an NW device, the first electronic device is an MT device.

Optionally, the execution module 602 may be configured to: send a CANCEL message to the second electronic device, and send the second INVITE request to the MT device.

Optionally, the execution module 602 may be configured to: send a BYE message to the second electronic device, and establish a target communication connection with the second electronic device, where the target communication connection is established on the basis of the second INVITE request.

Optionally, the execution module 602 may be configured to: in a case that it is determined according to target information that both the second INVITE request and the first INVITE request are sent by the second electronic device, send the target message to the second electronic device, where the target information includes at least one of the following items: a From header field, a To header field, or a Call-id value.

The call establishment apparatus in the embodiments of this application can be an apparatus, or can be a component in a terminal, an integrated circuit, or a chip. The apparatus can be a mobile electronic device or a non-mobile electronic device. Exemplarily, the mobile electronic device may be a mobile phone, a tablet computer, a notebook computer, a palm computer, an in-vehicle electronic device, a wearable device, an ultra-mobile personal computer (UMPC), a netbook, or a personal digital assistant (PDA); and the non-mobile electronic device may be a server, a network attached storage (NAS), a personal computer (PC), a television (TV), a teller machine, or a self-service machine, which are not specifically limited in the embodiments of this application.

The call establishment apparatus in the embodiments of this application may be an apparatus with an operating system. The operating system may be an Android operating system, an iOS operating system, or other possible operating systems, which is not specifically limited in the embodiments of this application.

The call establishment apparatus provided by the embodiments of this application can implement all processes implemented by the call establishment apparatus in the method embodiments shown in FIG. 1 to FIG. 4, details of which are omitted here for brevity.

Beneficial effects of the various implementations in this embodiment can specifically refer to the beneficial effects of the corresponding implementations in the above method embodiments, details of which are omitted here for brevity.

According to the call establishment apparatus provided by the embodiments of this application, in a case that a first INVITE request sent by the second electronic device is received and that the INVITE ACK message sent by the second electronic device is not received, and in a case that the second INVITE request sent by the second electronic device is received, for different application scenarios, the communication connection established on the basis of the first INVITE request can be interrupted by sending different target messages to the second electronic device, and the communication connection based on the second INVITE request is established, which increases the success rate of establishing a SIP-based call by the electronic devices in the above scenarios.

Optionally, the embodiments of this application further provide an electronic device, including a processor 110, a memory 109, and a program or an instruction stored in the memory 109 and executable on the processor 110. The program or instruction, when executed by the processor 110, implements all the processes of the above call establishment method embodiments and can achieve the same technical effects, details of which are omitted here for brevity.

It should be noted that the electronic devices in the embodiments of this application include the above mobile electronic device and the above non-mobile electronic device.

Figure 6:
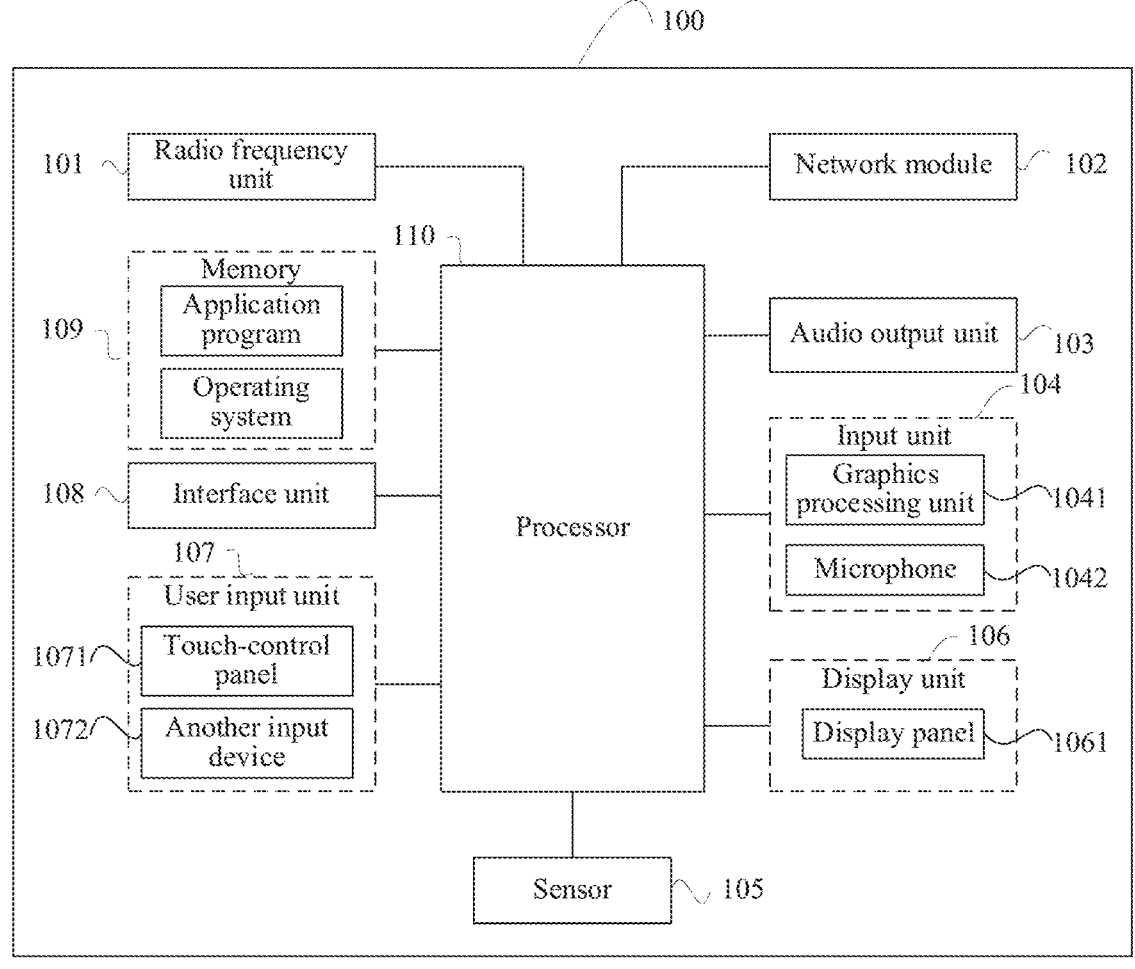
FIG. 6 is a schematic structural diagram of an electronic device according to an embodiment of this application.

FIG. 6 is a schematic structural diagram of hardware of an electronic device for implementing all the embodiments of this application.

The electronic device 100 includes, but is not limited to: a radio frequency unit 101, a network module 102, an audio output unit 103, an input unit 104, a sensor 105, a display unit 106, a user input unit 107, an interface unit 108, a memory 109, a processor 110, and other components.

A person skilled in the art can understand that the electronic device 100 can further include a power supply (such as a battery) for supplying power to the various components. The power supply may be logically connected to the processor 110 by using a power management system, thereby implementing functions such as charging, discharging, and power consumption management by using the power management system. The structure of the electronic device shown in FIG. 6 constitutes no limitation on the electronic device, and the electronic device may include more or fewer components than those shown in the figure, or some components may be combined, or a different component deployment may be used, details of which are omitted here.

The radio frequency unit 101 is configured to: in a case that a first INVITE request sent by a second electronic device is received and that an INVITE ACK message sent by the second electronic device is not received, receive a second INVITE request; and the radio frequency unit 101 is configured to: in a case that both the second INVITE request and the first INVITE request received by the radio frequency unit 101 are sent by the second electronic device, send a target message to the second electronic device, and the processor 110 is configured to establish a communication connection based on the second INVITE request, where the target message is used for interrupting a communication connection established on the basis of the first INVITE request.

In this way, in a case that the first INVITE request sent by the second electronic device is received and that the INVITE ACK message sent by the second electronic device is not received, and in a case that the second INVITE request sent by the second electronic device is received, the communication connection established on the basis of the first INVITE request is interrupted in a manner of sending the target message to the second electronic device, and the communication connection based on the second INVITE request is established, which increases the success rate of establishing a SIP-based call by the electronic devices in the above scenarios.

Optionally, in a case that the second electronic device is an MO device, the first electronic device is a network NW device; and in a case that the second electronic device is an NW device, the first electronic device is an MT device.

Optionally, the radio frequency unit 101 may be configured to: send a CANCEL message to the second electronic device, and send the second INVITE request to the MT device.

In this way, in a case that the second electronic device is the MO device and the first electronic device is the NW device, the first electronic device can send the CANCEL message to the second electronic device, and send the second INVITE request to the MT device, to ensure that the MO device and the MT device can successfully establish the SIP call.

Optionally, the radio frequency unit 101 may be configured to send a BYE message to the second electronic device, and the processor 110 is configured to establish a target communication connection with the second electronic device, where the target communication connection is established on the basis of the second INVITE request.

In this way, in a case that the second electronic device is the NW device and the first electronic device is the MT device, the first electronic device can send the BYE message to the second electronic device, and send the 200OK message to the MO device, to ensure that the MO device and the MT device can successfully establish the SIP call.

Optionally, the processor 110 is configured to: in a case that it is determined according to target information that both the second INVITE request and the first INVITE request are sent by the second electronic device, and the radio frequency unit 101 is configured to send the target message to the second electronic device, where the target information includes at least one of the following items: a From header field, a To header field, or a Call-id value.

In this way, for different scenarios, the first electronic device can determine, according to different information, whether the first INVITE request and the second INVITE request are sent by the same electronic device.

According to the electronic device provided by the embodiments of this application, in a case that a first INVITE request sent by the second electronic device is received and that the INVITE ACK message sent by the second electronic device is not received, and in a case that the second INVITE request sent by the second electronic device is received, for different application scenarios, the communication connection established on the basis of the first INVITE request can be interrupted by sending different target messages to the second electronic device, and the communication connection based on the second INVITE request is established, which increases the success rate of establishing a SIP-based call by the electronic devices in the above scenarios.

It should be understood that in the embodiments of this application, the input unit 104 may include a graphics processing unit (GPU) 1041 and a microphone 1042, and the GPU 1041 processes image data of static pictures or videos obtained by an image capturing apparatus (such as a camera) in a video capturing mode or an image capturing mode. The display unit 106 may include a display panel 1061, and the display panel 1061 may be configured by using a liquid crystal display, an organic light-emitting diode, and the like. The user input unit 107 includes a touch-control panel 1071 and another input device 1072. The touch-control panel 1071 is also referred to as a touch screen. The touch-control panel 1071 may include two parts: a touch detection apparatus and a touch controller. The another input device 1072 may include, but not limited to, a physical keyboard, a function key (such as a volume control key or a switch key), a track ball, a mouse, and a joystick, details of which are omitted here. The memory 109 may be configured to store a software program and various data, including but not limited to application programs and operating systems. The processor 110 may integrate an application processor and a modem processor. The application processor mainly processes an operating system, a user interface, an application program, and the like, and the modem processor mainly processes wireless communication. It can be understood that the above modem processor may either not be integrated into the processor 110.

The embodiments of this application further provide a non-transitory readable storage medium. The non-transitory readable storage medium stores a program or an instruction. The program or instruction, when executed by a processor, implements all the processes of the above call establishment method embodiments and can achieve the same technical effects, details of which are omitted here for brevity.

The processor is the processor in the electronic device in the above embodiment. The non-transitory readable storage medium includes a non-transitory computer-readable storage medium, for example, a computer read-only memory (ROM), a random access memory (RAM), a magnetic disk, or an optical disk.

The embodiments of this application further provide a chip. The chip includes a processor and a communication interface. The communication interface is coupled to the processor. The processor is configured to run a program or an instruction to implement all the processes of the above call establishment method embodiments and achieve the same technical effects, details of which are omitted here for brevity.

It should be understood that the chip mentioned in the embodiments of this application can also be referred to as a system-level chip, a system chip, a chip system, or a system-on-chip.

It should be noted that the terms "include", "comprise", or any other variations thereof here is intended to cover a non-exclusive inclusion, so that a processor, method, object, or apparatus including a series of elements not only includes those elements, but also includes other elements not specifically listed, or includes inherent elements of this process, method, object, or apparatus. Without more limitations, elements defined by the sentence "including one" do not exclude that there are still other same elements in the process, method, object, or apparatus including these elements. In addition, it should be noted that the scope of the methods and devices in the embodiments of this application is not limited to performing functions in the order shown or discussed, but may also include performing functions in a substantially simultaneous manner or in an opposite order according to the functions involved. For example, the methods described may be executed in an order different than that described, and various steps may also be added, omitted, or combined. In addition, features described with reference to some examples may also be combined in other examples.

According to the descriptions in the above implementations, a person skilled in the art may clearly learn that the method according to the above embodiment may be implemented by relying on software and an essential commodity hardware platform or by using hardware, but the former is a better implementation in most cases. Based on such an understanding, the technical solutions of this application essentially, or the part contributing to the prior art, may be presented in a form of a software product. The computer software product is stored in a storage medium (for example, a ROM/RAM, a magnetic disk, and an optical disk) including several instructions to enable an electronic device (which may be a mobile phone, a computer, a server, an air conditioner, a network device, and the like) to perform the methods described in all the embodiments of this application.

The embodiments of this application have been described above with reference to the accompanying drawings. The present application is not limited to the above implementations, and the above implementations are merely exemplary and not limitative. A person of ordinary skill in the art may make various forms under the teaching of this application without departing from the spirit of this application and the protection scope of the claims, and these forms shall fall within the protection of this application.

What is claimed is:

1. A call establishment method, applied to a first electronic device, wherein the method comprises:

in a case that a first INVITE request sent by a second electronic device is received and that an INVITE ACK message sent by the second electronic device is not received, receiving a second INVITE request; and in a case that it is determined that both the second INVITE request and the first INVITE request are sent by the second electronic device, sending a target message to the second electronic device, and establishing a communication connection based on the second INVITE request; wherein the target message is used for interrupting a communication connection established on the basis of the first INVITE request;

wherein in a case that the second electronic device is a mobile original (MO) device, the sending the target message to the second electronic device and establishing the communication connection based on the second INVITE request comprises sending a CANCEL message to the second electronic device and sending the second INVITE request to a mobile terminated (MT) device.

2. The method according to claim 1, wherein in a case that the second electronic device is the MO device, the first electronic device is a network (NW) device; and in a case that the second electronic device is the NW device, the first electronic device is the MT device.

3. The method according to claim 2, wherein in a case that the second electronic device further is the NW device, the sending the target message to the second electronic device, and establishing the communication connection based on the second INVITE request comprises:

sending a BYE message to the second electronic device, and establishing a target communication connection with the second electronic device, wherein the target communication connection is established on the basis of the second INVITE request.

4. The method according to claim 1, wherein in a case that both the second INVITE request and the first INVITE request are sent by the second electronic device, the sending the target message to the second electronic device comprises:

in a case that it is determined according to target information that both the second INVITE request and the first INVITE request are sent by the second electronic device, sending the target message to the second electronic device; wherein the target information comprises at least one of following items: a From header field, a To header field, or a Call-id value.

5. An electronic device, wherein the electronic device is a first electronic device comprising a processor, a memory, and a program or an instruction stored in the memory and executable on the processor, wherein the program or the instruction, when executed by the processor, causes the first electronic device to perform:

in a case that a first INVITE request sent by a second electronic device is received and that an INVITE ACK message sent by the second electronic device is not received, receiving a second INVITE request; and in a case that it is determined that both the second INVITE request and the first INVITE request are sent by the second electronic device, sending a target message to the second electronic device, and establishing a communication connection based on the second INVITE request; wherein the target message is used for interrupting a communication connection established on the basis of the first INVITE request;

wherein in a case that the second electronic device is a mobile original (MO) device, the program or the instruction, when executed by the processor, causes the first electronic device to perform:

sending a CANCEL message to the second electronic device, and sending the second INVITE request to a mobile terminated (MT) device.

6. The electronic device according to claim 5, wherein in a case that the second electronic device is the MO device, the first electronic device is a network (NW) device; and in a case that the second electronic device is the NW device, the first electronic device is the MT device.

7. The electronic device according to claim 6, wherein in a case that the second electronic device further is the NW device, the program or the instruction, when executed by the processor, causes the first electronic device to perform:

sending a BYE message to the second electronic device, and establishing a target communication connection with the second electronic device, wherein the target communication connection is established on the basis of the second INVITE request.

8. The electronic device according to claim 5, wherein in a case that both the second INVITE request and the first INVITE request are sent by the second electronic device, the program or the instruction, when executed by the processor, causes the first electronic device to perform:

in a case that it is determined according to target information that both the second INVITE request and the first INVITE request are sent by the second electronic device, sending the target message to the second electronic device; wherein the target information comprises at least one of following items: a From header field, a To header field, or a Call-id value.

9. A non-transitory readable storage medium, wherein the non-transitory readable storage medium stores a program or an instruction, and the program or the instruction, when executed by a processor of a first electronic device, causes the first electronic device to perform:

in a case that a first INVITE request sent by a second electronic device is received and that an INVITE ACK message sent by the second electronic device is not received, receiving a second INVITE request; and in a case that it is determined that both the second INVITE request and the first INVITE request are sent by the second electronic device, sending a target message to the second electronic device, and establishing a communication connection based on the second INVITE request; wherein the target message is used for interrupting a communication connection established on the basis of the first INVITE request;

wherein in a case that the second electronic device is a mobile original (MO) device, the program or the instruction, when executed by the processor, causes the first electronic device to perform:

sending a CANCEL message to the second electronic device, and sending the second INVITE request to a mobile terminated (MT) device.

10. The non-transitory readable storage medium according to claim 9, wherein in a case that the second electronic device is the MO device, the first electronic device is a network (NW) device; and in a case that the second electronic device is the NW device, the first electronic device is the MT device.

11. The non-transitory readable storage medium according to claim 10, wherein in a case that the second electronic device further is the NW device, the program or the instruction, when executed by the processor, causes the first electronic device to perform:

sending a BYE message to the second electronic device, and establishing a target communication connection with the second electronic device; wherein the target communication connection is established on the basis of the second INVITE request.

12. The non-transitory readable storage medium according to claim 9, wherein in a case that both the second INVITE request and the first INVITE request are sent by the second electronic device, the program or the instruction, when executed by the processor, causes the first electronic device to perform:

in a case that it is determined according to target information that both the second INVITE request and the first INVITE request are sent by the second electronic device, sending the target message to the second electronic device; wherein the target information comprises at least one of following items: a From header field, a To header field, or a Call-id value.

* * * * *